United States Patent
Nashed et al.

(10) Patent No.: US 11,860,278 B1
(45) Date of Patent: Jan. 2, 2024

(54) PHYSICAL MODELS FOR HIERARCHICAL CLUSTERING AND SYMBOLIC INFERENCE

(71) Applicant: Amazon Technologies, Inc., Seattle, WA (US)

(72) Inventors: Samer Nashed, Amherst, MA (US);
Jong Jin Park, Burlington, MA (US);
Joseph Durham, Portsmouth, NH (US)

(73) Assignee: Amazon Technologies, Inc., Seattle, WA (US)

( * ) Notice: Subject to any disclaimer, the term of this patent is extended or adjusted under 35 U.S.C. 154(b) by 1418 days.

(21) Appl. No.: 16/191,277

(22) Filed: Nov. 14, 2018

(51) Int. Cl.
*G01S 17/89* (2020.01)
*G05D 1/02* (2020.01)
*G06T 7/12* (2017.01)
*G06F 18/23* (2023.01)

(52) U.S. Cl.
CPC ............ *G01S 17/89* (2013.01); *G05D 1/0251* (2013.01); *G05D 1/0274* (2013.01); *G06F 18/23* (2023.01); *G06T 7/12* (2017.01); *G06T 2207/10028* (2013.01)

(58) Field of Classification Search
CPC .... G01S 17/89; G05D 1/0251; G05D 1/0274; G06K 9/6218; G06T 7/12; G06T 2207/10028
See application file for complete search history.

(56) References Cited

U.S. PATENT DOCUMENTS

| | | | |
|---|---|---|---|
| 2010/0070078 A1* | 3/2010 | Kong | G06K 9/00 700/259 |
| 2013/0271577 A1* | 10/2013 | Watanabe | H04N 13/275 348/46 |
| 2018/0321686 A1* | 11/2018 | Kanzawa | G08G 1/166 |

OTHER PUBLICATIONS

Joydeep Biswas and Manuela M. Veloso, "Model-Instance Object Mapping," Carnegie Mellon University Research Showcase, Computer Science Department, 13 pages, Jul. 2014.
(Continued)

*Primary Examiner* — Jeff A Burke
*Assistant Examiner* — Sihar A Karwan
(74) *Attorney, Agent, or Firm* — Eversheds Sutherland (US) LLP

(57) ABSTRACT

Embodiments herein describe a robotic system that uses range sensors to identify a vector map of an environment. The vector map includes lines that outline the shape of objects in the environment (e.g., shelves on the floor of a warehouse). The system identifies one or more line segments representing the boundary or outline of the objects in the environment using range data acquired by the range sensors. The robotic system can repeat this process at different locations as it moves in the environment. Because of errors and inaccuracies, line segments formed at different locations may not clearly align even when these line segments correspond to the same object. To account for this error, the robotic system match line segments identified at a first location with line segments identified at a second location. The matched line segments can be merged into a line that is stored in the vector map.

20 Claims, 9 Drawing Sheets

(56) References Cited

OTHER PUBLICATIONS

Joydeep Biswas and Manulea Veloso, "Depth Camera Based Indoor Mobile Robot Localization and Navigation," University of Massachusetts Amherst, ScholarWorks@UMass Amherst, Computer Science Department Faculty Publication Series, 8 pages, 2012.

Samer B. Nashed and Joydeep Biswas,"Human-in-the-Loop SLAM," arXiv:1711.08566v1 [cs.HC] Nov. 23, 2017, 9 pages.

Samer Nashed and Joydeep Biswas, "Curating Long-Term Vector Maps," College of Information and Computer Sciences, University of Massachusetts, Amherst, 6 pages.

* cited by examiner

PHYSICAL MODELS FOR HIERARCHICAL CLUSTERING AND SYMBOLIC INFERENCE

BACKGROUND

The present invention relates to mapping an environment using a robot, and more specifically, to generating vector maps using range sensors on a robot.

Current robotic mapping systems rely on an occupancy grid to map the environment of the robot. The occupancy grid is a top view of the environment containing the robot (e.g., a warehouse, residence, and the like) where the floor of the environment is subdivided into predefined cells that have widths and lengths of several centimeters. Using range or depth sensors, the robot determines whether an object occupies each cell of the occupancy grid. For example, each grid can have a flag indicating whether there is an object at the corresponding location in the environment.

Occupancy grids, however, suffer from several drawbacks. First, as the size of the environment grows, so does the memory requirements for storing the cells. Second, the accuracy of the occupancy grid is limited by the cell size. For example, the range sensors may be able to accurately determine the range of objects with an accuracy of less than one centimeter but the occupancy grid may have cells with widths and lengths of five centimeters which means although more accurate location data is available, the occupancy grid can only store locations with an accuracy of five centimeters. Thus, navigating a robot in an environment relying on an occupancy grid can lead to sub-optimal results.

DETAILED DESCRIPTION

Embodiments herein describe a robotic system that uses range sensors to identify a vector map of an environment. Rather than generating an occupancy grid which has the disadvantages described above, the vector map includes lines that outline the shape of objects in the environment (e.g., shelves or pallets disposed on the floor of a warehouse). The lines defining the vector map can be compactly stored in memory and have the same accuracy as the range sensors used to capture the range data. The robot can then use the vector map to safely navigate the environment.

In one embodiment, the robotic system generates 2D or 3D point clouds using the range data captured by range sensors mounted on the robot. Using clustering, the system identifies one or more line segments representing the boundary or outline of the objects in the environment. The robotic system can repeat this process at different locations as it moves in the environment—e.g., every six inches or every several feet. However, the orientation and translation of the line segments at each location where the robot collects the sensor data may be off due to errors in the internal navigation system of the robot. Put differently, at a first location the robot identifies a first line segment defining a boundary of a shelf, but at a second location, the robot identifies a second line segment which corresponds to the same shelf but has a translation or orientation different from the first line segment. Put differently, the first and second line segments do not clearly align even though they were formed from range data corresponding to same object in the environment.

To account for the error in the internal navigation system, in one embodiment the robotic system performs iterative closest vector (ICV) analysis which iterates between the line segments generated by the robot at two different locations to determine the translational and orientation differences between the segments. The line segments with the smallest translational and orientation differences are most likely lines that correspond to the same object. The robotic system can then use an estimated covariance of the matched line segments to merge the line segments into a line (or vector) that can be stored in the vector map. In this manner, lines or vectors defining the shapes of objects in the environment can be used to form a vector map of the environment.

Figure 1:
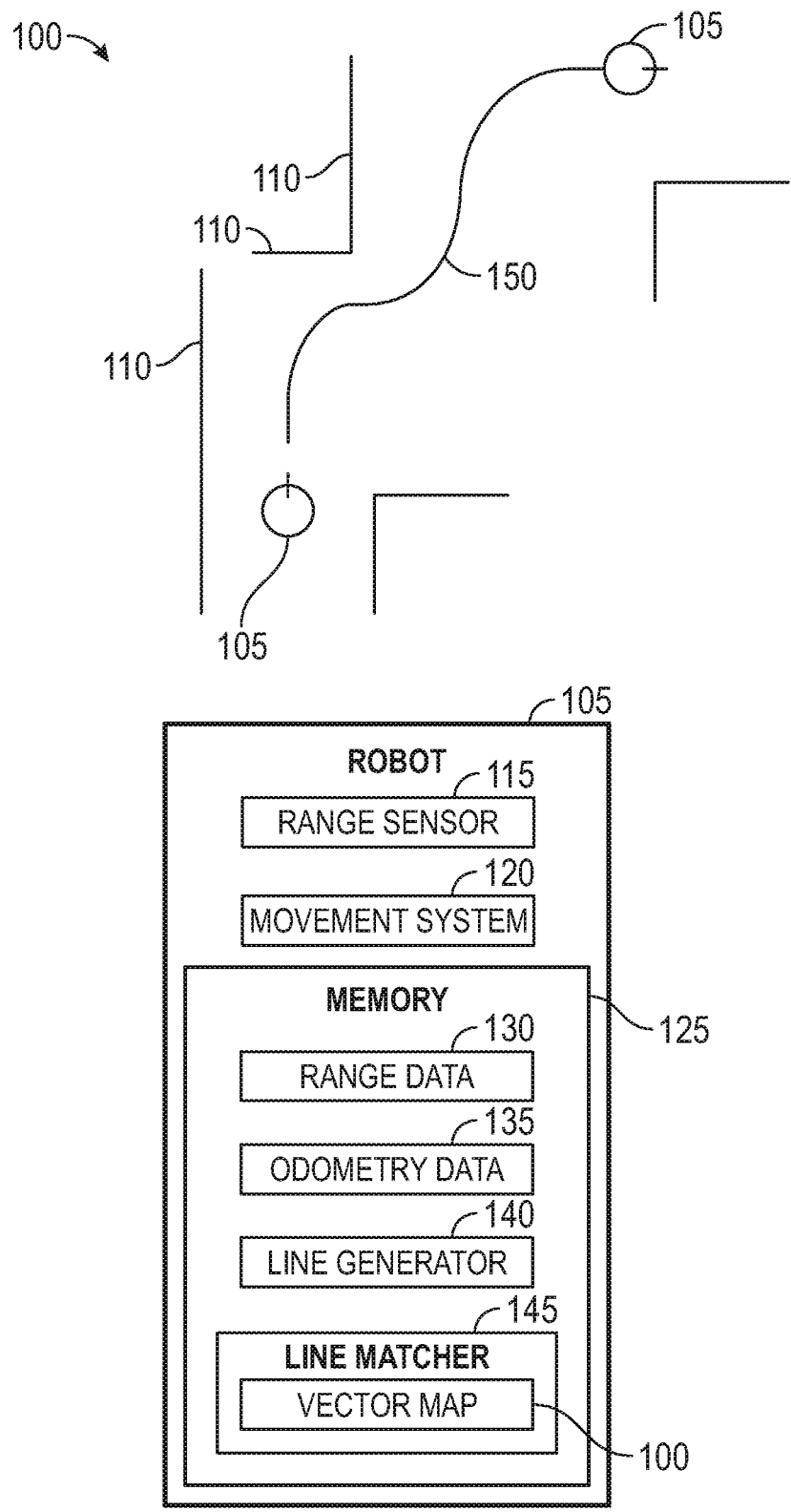
FIG. 1 illustrates a vector map generated by a robot, according to various embodiments.

FIG. 1 illustrates a vector map 100 generated by a robot 105, according to various embodiments. As shown, the vector map 100 includes object boundaries 110 that are the boundaries or shapes of objects within a real-world environment traversed by the robot 105. For example, the vector map 100 may be a map of a warehouse containing the robot 105 where the object boundaries 110 represent locations of walls, shelves, pallets, and other objects disposed on the floor of the warehouse. In other examples, the vector map 100 could map other types of indoor environments (e.g., homes, offices, stores, shipping containers, or parking garages) as well as outdoor environments (e.g., sporting venues, parks, or loading docks).

The vector map 100 includes gaps between the object boundaries 110 which may be outside the range of sensors 115 used by the robot when traversing the path 150. That is, the robot 105 may not be close enough to these objects to detect their boundaries when traversing the path 150. However, in some embodiments, the robot 105 may include a navigation system that identifies incomplete portions of the map 100 and instructs the robot to return to these areas to map unknown regions. In one embodiment, the sensor 115 includes a depth sensor, a time-of-flight camera, or Lidar.

In addition to the range sensor 115 for detecting objects, the robot 105 also includes a movement system 120 which propels the robot 105 in the environment. The movement system 120 can include wheels, tracks, legs, and the like for moving the robot 105 along the path 150. An internal navigation system in the movement system 120 can output odometry data 135 which tracks the orientation and movement of the robot 105 in the system environment. For example, the internal navigation system may track the rotation of a wheel to determine how far the robot has moved, or monitor the output of an inertial measurement unit (IMU) and/or accelerometers and gyroscopes to determine an orientation or acceleration of the robot 105 along the path 150.

The robot 105 has a memory 125 that stores the range data 130 generated by the range sensor 115 and the odometry data 135 generated by the movement system 120. The memory 125 also includes a line generator 140 and a line matcher 145 which may be applications, software modules, firmware, hardware, or combinations thereof which use the range data 130 and the odometry data 135 to detect the object boundaries 110 for the vector map 100. In one embodiment, the line generator 140 uses the range data 130 to generate line segments at various locations along the path 150. That is, every few inches or feet, the robot 105 activates the range sensor 115 to generate updated range data 130 which the line generator 140 converts into one or more line segments.

Because the line segments at one location may not align with the line segments at a previous location due to errors in the odometry data 135, as described in more detail below, the line matcher 145 determines which line segments generated at the current location match line segments generated at the previous location where range data 130 was gathered. Stated differently, the line matcher 145 identifies lines segments identified at a first location that correspond to the same objects as line segments identified at a second location, thereby indicating the line segments should be merged because they represent the same boundary of a particular object. By merging line segments, the line matcher 145 generates lines which represent the object boundaries 110 illustrated in the vector map 100.

In one embodiment, the lines (or line segments) defining the object boundaries 110 can be stored in the memory 125 using significantly less memory than using an occupancy grid which divides the environment into plurality of cells. Further, the lines forming the object boundaries 110 can be stored as scatter matrices which store the center of mass of the lines, the mass (or points of the line), and the orientation of the line in the environment, which further reduces the amount of memory 125 used to store the vector map 100.

Figure 2:
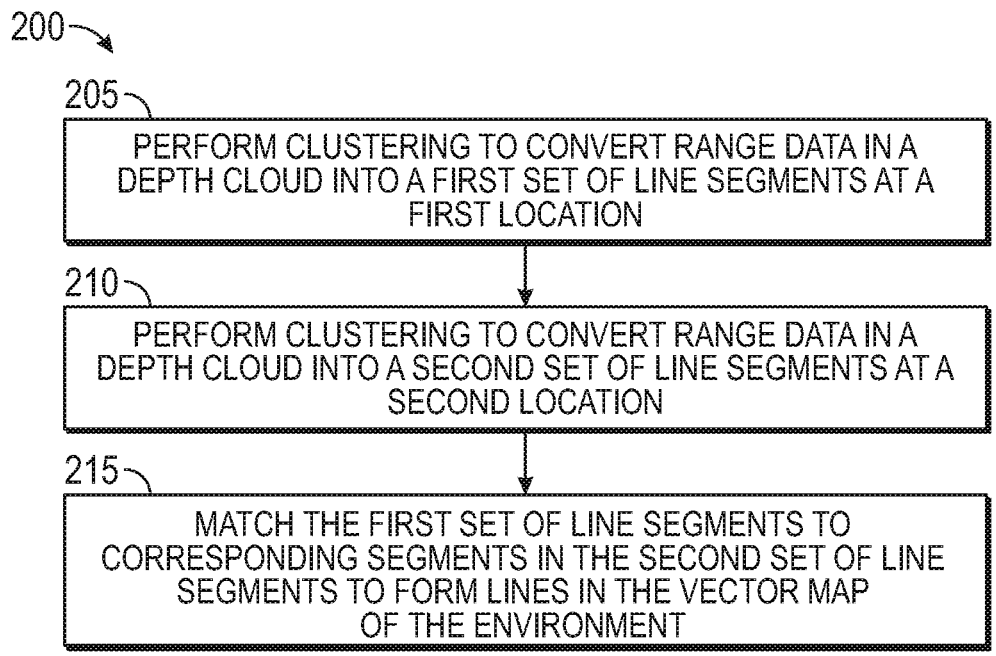
FIG. 2 is a flowchart for generating a vector map using range sensors on a moving robot, according to various embodiments.

FIG. 2 is a flowchart of a method 200 for generating a vector map using range sensors on a moving robot, according to various embodiments. The method 200 begins at block 205 where the line generator on the robot performs clustering to convert range data in a depth cloud into a first set of line segments at a first location. As described in more detail in FIG. 3, the line generator forms a 2D or 3D depth cloud from the range data captured by a sensor on the robot (e.g., depth sensor, a time-of-flight camera, or Lidar). From the depth cloud, the line generator forms one or more lines segments which indicate the boundaries of objects in the environment around the robot.

In one embodiment, the line generator uses an ICV algorithm to generate the line segments. Using ICV rather than using an iterative closest points (ICP) approach to identify the boundary of an object may yield computational efficiency, although the line segments have to first be identified from the points.

At block 210, the line generator performs clustering to convert range data in a depth cloud into a second set of line segments at a second location. That is, the line generator on the robot may repeat the process used to generate the first set of line segments at block 205 at a different location in order to generate the second set of line segments. In one embodiment, the robot may stop at the first location, generate the first set of line segments using range data captured at the first location, move to the second location, and then stop to generate the second set of lines segments using updated range data. However, in other embodiments, the robot may capture the range data while moving (e.g., without stopping).

Ideally, the segments in the first line segments would align with corresponding segments in the second line segments thereby indicating line segments that pertain to the same object. That is, the line segments captured at the two locations (assuming the locations are sufficiently close together) may at least partially overlap or at least have a similar orientation. However, the locations and orientation of the line segments at the two locations may be determined by an internal navigation system such as an IMU or wheel rotation tracker in the movement system 120 illustrated in FIG. 1. Due to errors in these components, the line segments identified at the two locations may not overlap or have the same orientation. Thus, it may not be apparent which lines segments in the first and second sets correspond to the same object in the environment.

At block 215, the line matcher matches the first set of lines segments to corresponding segments in the second set of line segments to form lines in the vector map of the environment. That is, the line matcher can overcome the error in the internal navigation system in the robot to identify which line segments in the first and second sets correspond to the same physical object in the environment. The details for matching the lines segments are described later in FIG. 8.

One advantage of the method 200 is that a vector map generated from the matched line segments is inherently resolved as the robot moves to places in the environment it has mapped previously. One difficulty in environment mapping using simultaneous localization and mapping (SLAM) is identifying and resolving locations in the environment that a robot has previously mapped. This is important to identify whether there is a new object in the environment or seemingly new object is a previously mapped object which, due to inaccuracies in the mapping process, now appears to be in a different location or orientation. However, using the SLAM techniques described herein, the mapping system can automatically detect and resolve previously detected objects with current measured sensor data as well as identify new objects. This improves the ability of the mapping system to identify old and new objects in the environment.

Figure 3:
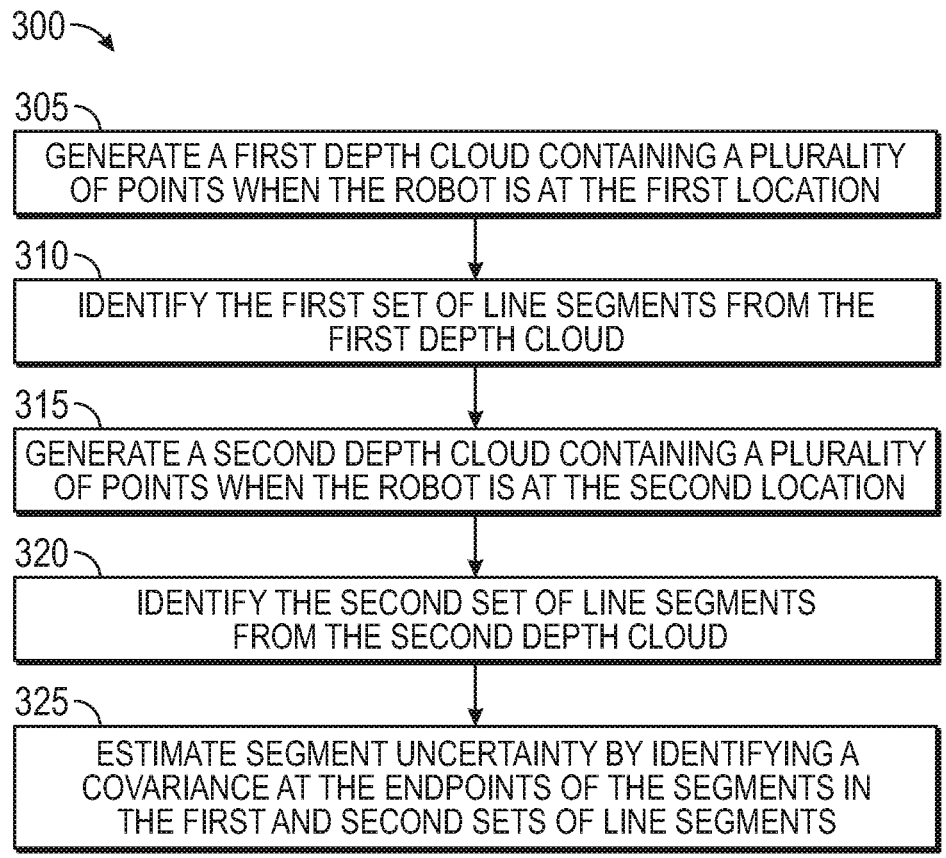
FIG. 3 is a flowchart for generating line segments from point clouds representing objects in the environment, according to various embodiments.

FIG. 3 is a flowchart of a method 300 for generating line segments from point clouds representing objects in the environment, according to various embodiments. In one embodiment, the method 300 illustrates a specific technique for identifying the first and second sets of line segments at blocks 205 and 210 of the method 200 in FIG. 2.

The method 300 begins at block 305 where the line generator generates a first depth cloud containing a plurality of points when the robot is at the first location. In one embodiment, the points are generated from the range data captured by distance or range sensors on the robot. Deriving points from the range data and generating a depth cloud is shown in FIG. 4.

Figure 4:
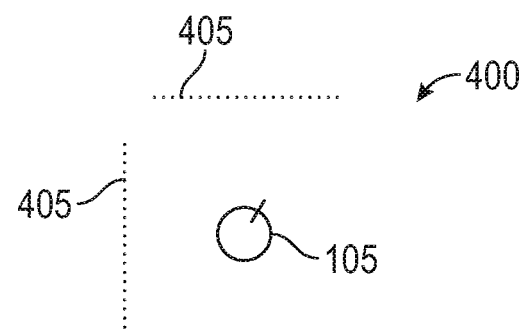
FIG. 4 illustrates depth cloud points representing objects in the environment, according to various embodiments.

FIG. 4 illustrates depth cloud points 405 representing objects in the environment, according to various embodiments. In one embodiment, the points 405 are part of a 2D depth cloud that represents objects disposed on a surface in an environment 400 in which the robot 105 travels. The points 405 can be generated using a depth sensor, time-of-flight sensor, or Lidar. For example, the points 405 here could represent a corner of a wall or two shelves that intersect.

Note that in FIG. 4 there are no points 405 at the corner where the sides of the object (or objects) intersect. This may be because the corner of the object is beyond the range of the sensor on the robot 105. Moreover, although points 405 in a 2D depth cloud or 2D plane are shown, in other embodiments, the robot may identify points in a 3D depth cloud (where points could be at various distances above the surface of the environment 400 on which the robot 105 traverses). Thus, rather than identifying the footprint of the objects at the floor of the environment 400 as shown in FIG. 4, a 3D depth cloud could be used to identify a shape of the object as it extend in a vertical direction away from the floor.

Returning to method 300, at block 310, the line generator identifies the first set of line segments from the first depth cloud. In one embodiment, the line generator uses clustering to identify points that should be grouped together to form a line. For example, the line generator can use clustering to identify the points in the group that define a line in a common direction. The embodiments herein are not limited to any specific clustering algorithms to evaluate the depth clouds in order to identify line segments.

Figure 5:
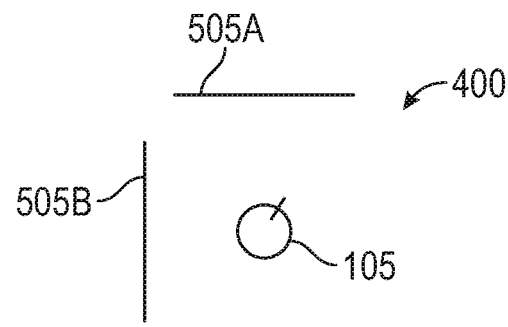
FIG. 5 illustrates using clustering to identify line segments from the depth cloud points in FIG. 4, according to various embodiments.

FIG. 5 illustrates using clustering to identify line segments from the depth cloud points in FIG. 4, according to various embodiments. In FIG. 5, the line generator identifies the line segment 505A and line segment 505B using the points 405 illustrated in FIG. 4. These line segments 505 may be portions of boundaries of objects in the environment 400 such as shelving, walls, pallets, furniture, and the like.

While the points 405 and the line segments 505 in FIGS. 4 and 5 are straight, the embodiments herein are not limited to detecting objects with straight surfaces. Although generating line segments may work best for mapping objects with straight lines, the embodiments herein can still identify boundaries that have curved sides. In that case, the line generator may subdivide the curved surface into a plurality of smaller, straight line segments which approximate the curved side.

Returning to method 300, at block 315 the line generator generates a second depth cloud containing a plurality of points when the robot is at the second location. That is, after gathering range data at a first location for performing blocks 305 and 310, the robot can move to the second location and gather range data for performing block 315. After generating the second point cloud using the updated range data, at block 320, the line generator identifies the second set of line segments using the second point cloud. In one embodiment, the line generator can use a similar or same clustering technique to identify both the first and second sets of line segments.

In one embodiment, the translations (e.g., the location of the line segments in the environment) and the orientation of the line segments in the first and second sets depends on the odometry data identified by the movement system. For example, when moving from the first location to the second location, an internal navigation system may track the wheel rotation to identify the distance moved by the robot, or use acceleration data provided by an IMU to determine the facing direction or orientation of the robot. Based on this odometry data, the line generator can determine the translation (i.e., the location of the line segment) and the orientation of the line segments on the floor of the environment.

However, due to wheel slips or imperfection in the data generated by the IMU, the translation and orientation of the line segments may be off from what is expected. That is, line segments in the first and second sets that correspond to the same object may have different locations and orientations in the environment. Thus, it can be unclear whether the lines segments in the first and second sets correspond to the same object or different object. This error is illustrated in FIG. 6.

Figure 6:
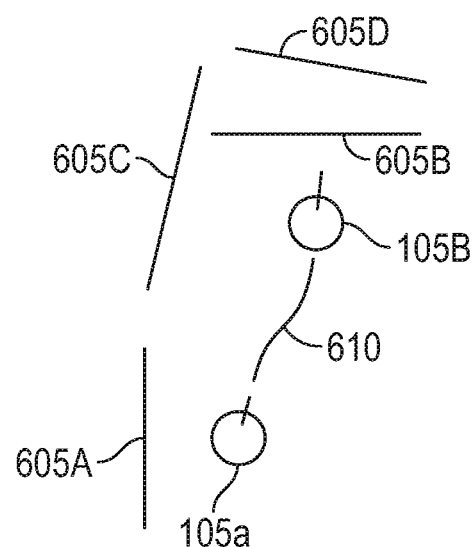
FIG. 6 illustrates identifying line segments representing objects when the robot is at two different locations, according to various embodiments.

FIG. 6 illustrates identifying line segments representing objects when the robot is at two different locations, according to various embodiments. The line segments 605A and 605B are line segments identified when the robot is at Position A. In contrast, the line segments 605C and 605D are identified when the robot is at Position B after moving along the path 610 from Position A. For example, the robot may gather new range data each time the movement system indicates the robot has moved a predefined distance (e.g., every six inches or two feet) or at predefined times (e.g., every four seconds).

In this example, the line segments 605A and 605C correspond to the same side of a first object while the line segments 605B and 605D correspond to the same side of a second object. As such, ideally the line segments 605A and 605C would have the same orientation in the environment and could have overlapping portions (depending on the distance between Position A and Position B). Similarly, the line segments 605B and 605D should have the same orientation in the environment and could have overlapping portions. However, imperfections in the location and orientation of the robot in the odometry data results in the lines segments 605C and 605D having different orientations than the orientations of the line segments 605A and 605B. As discussed below in FIG. 8, the line matcher can perform a matching and merging process to compensate for this error and adjust the locations and orientations of the line segments 605 so the corresponding segments at least have the same orientation and may have overlapping portions.

Returning to method 300, at block 325 the line generator estimates segment uncertainty by identifying a covariance at the endpoints of the segments in the first and second sets of line segments. In one embodiment, the points in the cluster used to generate the line segments at blocks 305 and 315 have uncertainty resulting from inaccuracies in the distance measurements generated by the range sensor. For example, a depth sensor or Lidar sensor may generate distance measurements that may be off by +/−1-2 centimeters. As such, because the clustering algorithms use these points to generate the line segments, the uncertainty in the can lead to inaccuracies in the location and orientation of the line segments.

Figure 7:
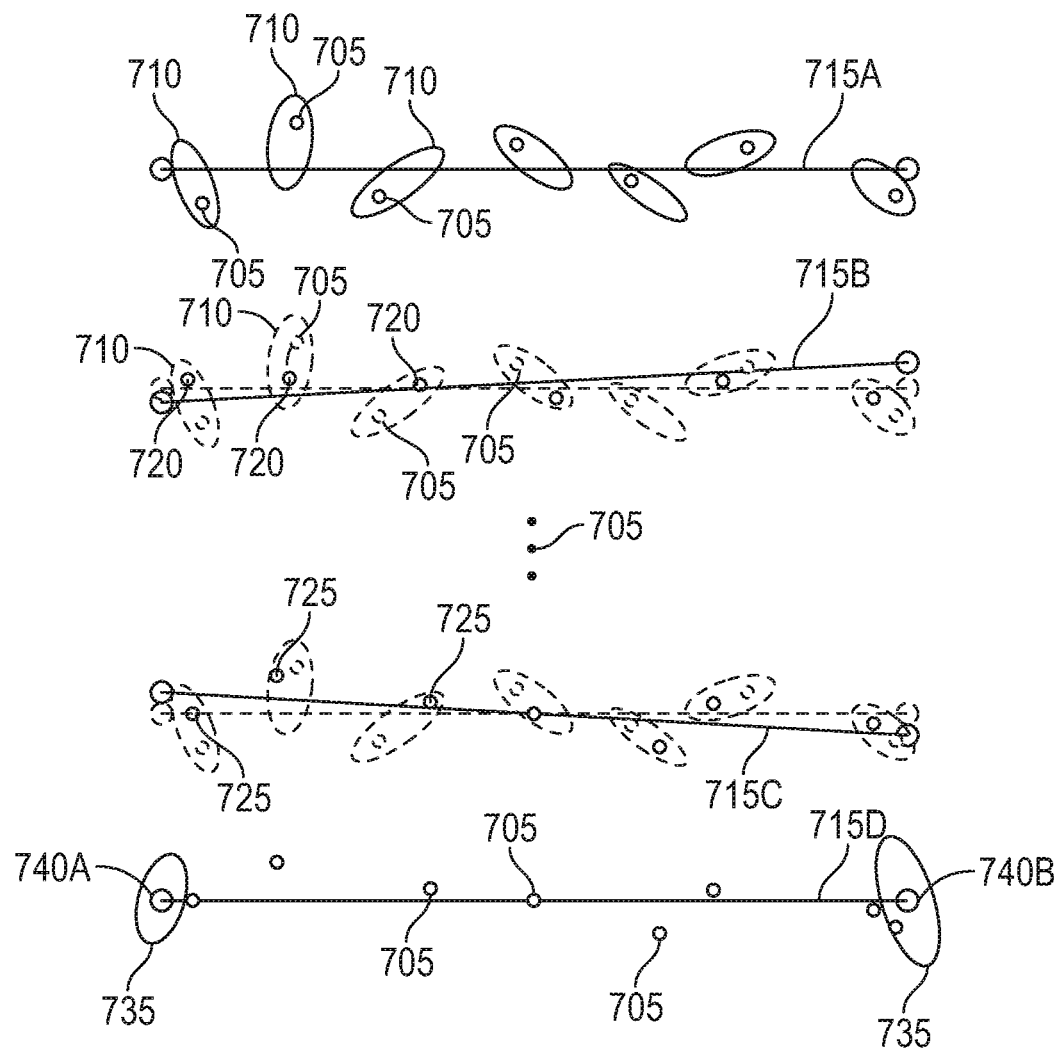
FIG. 7 illustrates estimating the uncertainty of the lines segments, according to various embodiments.

FIG. 7 illustrates estimating the uncertainty of the lines segments, according to various embodiments. Specifically, FIG. 7 illustrates forming line segments using the points 705 derived from data generated by a range sensor. For example, using a clustering algorithm, the line generator may have determined that the points 705 correspond to the same object, and thus, should be grouped as the same line.

As mentioned above, the location of the points 705 may be uncertain due to inaccuracies in the range sensor. This uncertainty is modeled by ellipses 710 surrounding the points 705. That is, the ellipses 710 indicate a region centered at the points 705 which indicate where the actual location of the object should be. Thus, the actual point or location of the object can be located within the ellipses 710.

In one embodiment, the line matcher identifies outliers from the set of points which may be due to obvious error (such as reflections or backscattering) that provide a false location of the object. The line generator can use any technique to identify an outlier (or multiple outliers) from the set of points 705. These outlier points can be discarded. For simplicity, FIG. 7 illustrates only inlier points 705.

In one embodiment, the line generator derives different line segments by selecting different locations of the points within the uncertainty ellipses 710. FIG. 7 illustrates performing 1-k iterations using the uncertainty ellipses 710 to determine different line segments. For example, the line segment 715A is derived from the actual or original points 705. For example, the line generator can use a fitting algorithm to identify the line segment 715A which best fits the locations of the points 705.

The line segment 715B illustrates selecting different points 720 within the uncertainty ellipses 710. For example, the points 720 may be randomly selected from within the ellipses 710. Using these points 720, the line generator can again identify the line segment 715B which best fits the points 720. The original line segment 715A, points 705, and ellipses 710 are shown as dotted lines.

The line segment 715C illustrates selecting different points 725 during a $k^{th}$ iteration of the line fitting algorithm where again the original line segment 715A, points 705, and ellipses 710 are shown as dotted lines. In this example, the line generator again selects different points 730 within the ellipses and identifies the line segment 715C which best fits these points 730. Because the points at each iteration may be different, the resulting location and orientation of the line segments 715 may differ each time the fitting algorithm is performed.

In this example, the line segment 715D (e.g., a representative line segment) has the same location and orientation as the line segment 715A derived from the original inlier points 705. However, in another example, the location and orientation of the line segment 715D is derived from the line segments identified during the 1-$k^{th}$ iterations. For example, the location of orientation of the line segment 715D may be the average of the locations of the line segments identified during the 1-$k^{th}$ iterations.

In any case, the line generator uses the locations and orientations of the line segments derived from the 1-$k^{th}$ iterations to identify estimated covariance 735 of the endpoints 740 of the line segment 715D. In one embodiment, the estimated covariance 735 is identified by tracking the locations of the endpoints of the line segments 715 derived from the 1-k iterations. In this example, the covariance 735 is an ellipse which indicates the possible endpoints of the line segment 715D. Thus, rather than tracking the uncertainty ellipses 710 corresponding to each point 705, the uncertainty of the line segment 715D can be represented by the covariance 735 at the endpoints 740.

In one embodiment, each line segment in the first and second sets derived at blocks 305 and 315 is represented by the covariance 735 at the endpoints 740A and 740B. The covariance 735 can represent the various possible locations and orientations of the line segment 715D which then can be used to match line segments from the first and second sets as described below.

Figure 8:
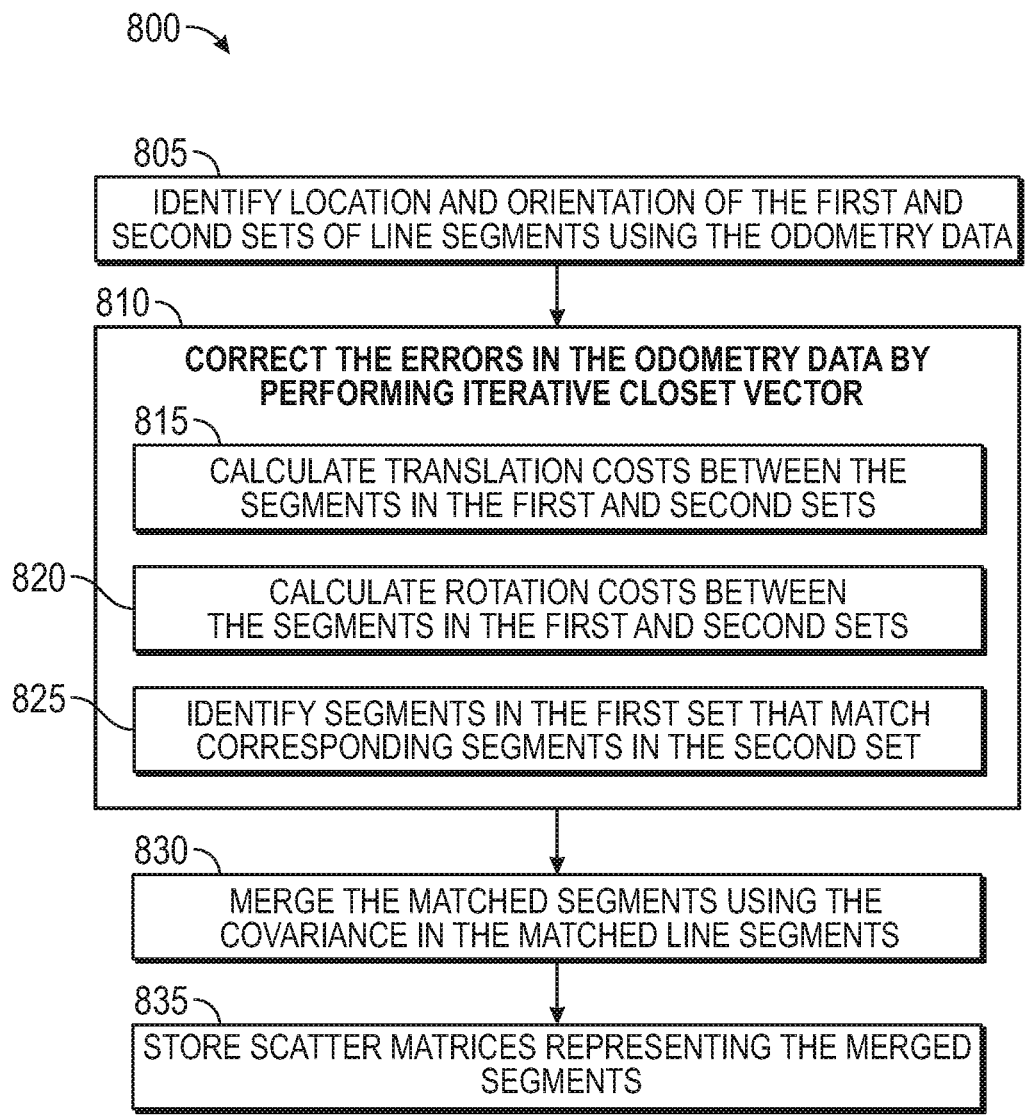
FIG. 8 is a flowchart for merging line segments identified when the robot is at two different locations, according to various embodiments.

FIG. 8 is a flowchart of a method 800 for merging line segments identified when the robot is at two different locations, according to various embodiments. At block 805, the line matcher identifies the locations and orientations of first and second sets of line segments using odometry data. As described above, the robot may use an internal navigation system (e.g., the IMU or wheel turns) to determine, at least in part, the location and orientation of the first and second sets of line segments. As shown in FIG. 6, although a line segment in the first set and a line segment in the second set may correspond to the same object, they may have locations and orientations that make it unclear whether or not they do represent the boundary of the same object.

At block 810, the line matcher corrects the odometry data. To do so, at block 815, the line matcher uses an ICV technique or algorithm to calculate translation costs between each line segment in the first segment with each line segment in the second set. Put differently, the line matcher determines a location difference between the line segments in the first and second sets. This location or translation difference may be computed based on an average location of the segments or by some other means. In one embodiment, the smaller the distance, the more likely it is that the two segments being compared in the two sets are the same edge of an object.

At block 820, the line matcher uses the ICV technique to calculate rotation costs between each line segment in the first segment with each line segment in the second set. That is, the line matcher determines how much the orientation of a line segment in the first set differs from the orientation of the line segments in the second set, or how much one of the segments should be rotated in order to have the same orientation as the other segment. In one embodiment, the smaller the difference in orientation, the more likely it is two segments in the two sets are the same edge of an object.

At block 825, the line matcher identifies segments in the first set that matches segments in the second set. That is, the line matcher uses the translation and orientation costs to determine whether two line segments in the first and second set match, and thus, correspond to the same object edge. Equation 1 illustrate an example ICV algorithm that can be used to identify matching line segments:

$$\mathrm{argmin} \sum_{i=1}^{M} \left\| K_T\left(\hat{n}_{w_i}\left(A v_i^{cm} - w_i^1\right)\right) + K_R\left(A\vec{v} \cdot \hat{n}_{w_i}\right) \right\| \tag{1}$$

In Equation 1, the value $\hat{n}_{w_i}(A v_i^{cm} - w_i^1)$ represents the translation cost between two line segments while the value $A\vec{v} \cdot \hat{n}_{w_i}$ represents the rotation cost between those segments. The values $K_T$ and $K_R$ are constant values associated with calculating the translation and rotation costs. The line matcher may determine that two lines match if they have the lowest translation and rotation costs. That is, the line matcher may use Equation 1 to generate an overall cost which compares a first line segment in the first set to all the line segments in the second set. The line segment in the second set that results in the smallest overall cost is deemed as the match to the first line segment. Equation 1, however, is just one example of an ICV algorithm for identifying whether two line segments (which were generated using data captured when the robot was at two different locations) correspond to the same object.

Figure 9:
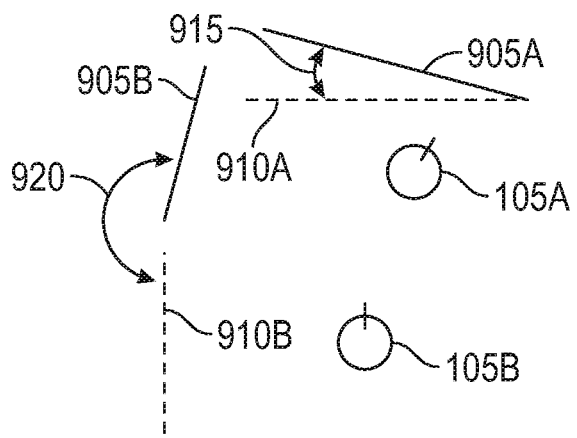
FIG. 9 illustrates translation and orientation errors between line segments when the robot is at two different locations, according to various embodiments.

FIG. 9 illustrates translation and orientation errors between line segments when the robot is at two different locations, according to various embodiments. Specifically, FIG. 6 includes line segments 905 generated when the robot 105 is at Location A in the environment and line segments 910 are generated when the robot 105 is at Location B.

Because of the error and inaccuracies corresponding to the internal navigation system of the robot 105, the line segments 905A and 910A which correspond to the same edge or surface of a physical object and the line segments 905B and 910B which correspond to the same edge or surface of a physical object are misaligned. Nonetheless, using the portion of the method 800 described above, the line merger can determine that the line segment 905A should be merged with the line segment 910A and the line segment 905B should be merged with the line segment 910B.

The misalignment between the line segments 905A and 910A is illustrated by error 915. The error 915 can include a misalignment in the translation or locations of the line segments 905A and 910A and the misalignment in the orientations of these line segments. The misalignment between the line segments 905B and 910B is illustrated by error 920 and can include a misalignment in the translation or locations of the line segments 905B and 910B and the misalignment in the orientations of these line segments.

Returning to the method 800, at block 830 the line matcher merges the matching line segments in the first and second set. That is, the line matcher can reorient and/or move the line segments so that the matched line segments now have the same orientation. Further, depending on how far the robot moved when generating the first and second sets, a portion of the matching line segments may overlap.

Figure 10:
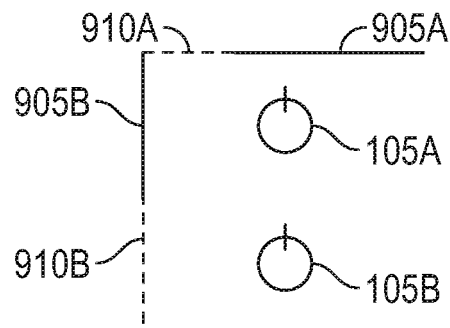
FIG. 10 illustrates merging the line segments identified when the robot is at two different locations, according to various embodiments.

FIG. 10 illustrates merging the line segments identified when the robot is at two different locations, according to various embodiments. As shown, the line matcher corrects the errors 915 and 920 in FIG. 9 by merging the line segment 905A and 910A and merging the line segment 905B and 910B. Although FIG. 10 illustrates that the merged line segments at least partially overlap, this is not a requirement. Depending on how much the robot 105 moves between Location B and Location A, the merged line segments might not overlap but nonetheless correspond to the same edge or surface.

Figure 11:
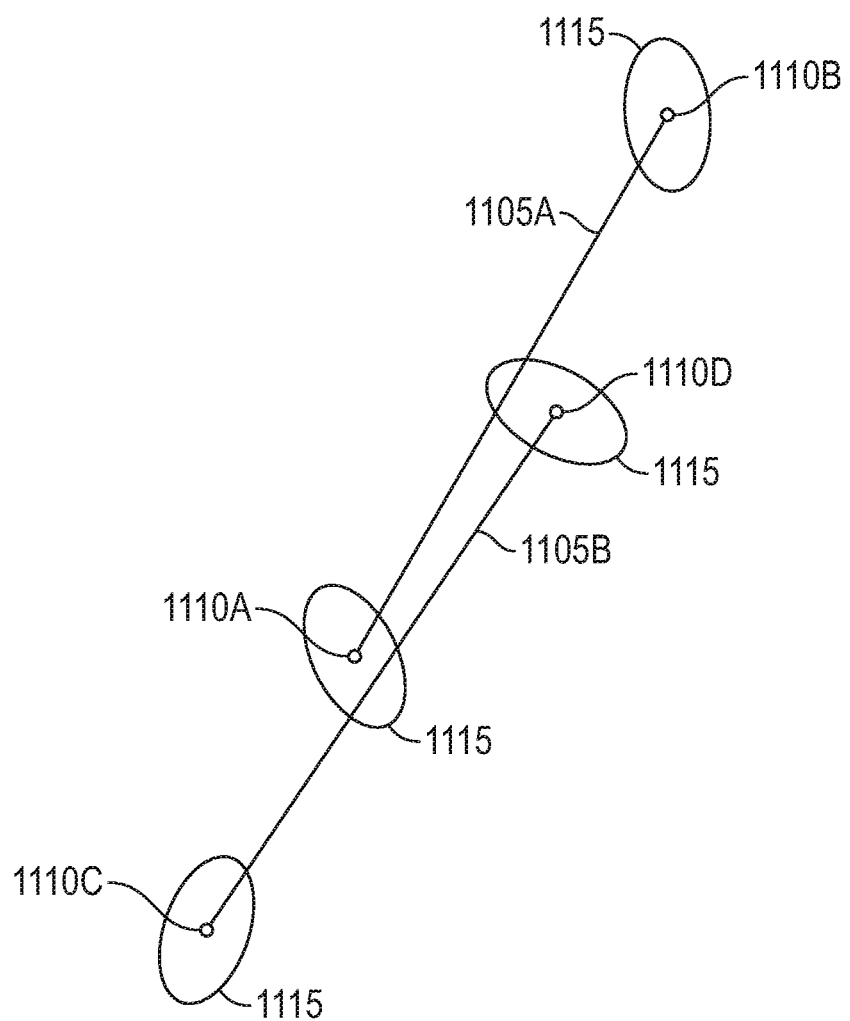
FIG. 11 illustrates merging two line segments using their covariance, according to various embodiments.

In one embodiment, the line matcher uses the covariance at the endpoints of the line segments when merging them to form a single line segment or vector. FIG. 11 illustrates merging two line segments using their covariance, according to various embodiments. As shown, the endpoints 1110 of the line segments 1105 each include an estimated covariance 1115 which may be derived using the embodiments described above. Before merging the line segments 1105, the line matcher may first determine whether the covariance 1115 of one segment overlaps with the location of the other line segment.

In FIG. 11, the covariance 1115 for the endpoint 1110A of the line segment 1105A overlaps the line segment 1105B. Similarly, the covariance 1115 for the endpoint 1110D for the line segment 1105B overlaps the line segment 1105A. This overlapping can indicate that location and orientation of the line segments 1105A and 1105B are within the error range of the sensor used to generate the range data. Put differently, the line segments 1105 likely correspond to the same object, but due to error in the range data and the odometry data, they may have different locations or orientations.

In one embodiment, the covariance 1115 of the endpoints 1110 may be used along with the translation and rotation cost to match and merge the line segments. For example, after identifying the segments in the first and second sets with the smallest translation and rotation costs, the line matcher may merge them into a single line segment only if the covariance 1115 of at least one endpoint 1110 of one line segments overlaps the other line segment. However, in another embodiment, the line matcher may match the line segments in the first and second sets solely using the covariance 1115 of the endpoints 1110 (e.g., without calculating the translation and orientation costs).

At block 835, the line matcher stores scatter matrices representing the merged segments. As discussed above, an occupancy grid requires a large amount of data, especially as the size of the environment increases and the size of each block in the grid decreases. However, storing representations of merged line segments as scatter matrices can result in a large reduction in memory utilized when mapping the same environment.

In one embodiment, the line matcher generates a scatter matrix for each line segment in the vector map of the environment. In one embodiment, the line matcher encodes the center of mass of the line segment, a mass of the line segment, and an orientation of the line segment. In one embodiment, the center of mass represents the covariance (or the uncertainty) at each endpoint of the line segment. As illustrated above, the covariance can have an elliptical shape which illustrates possible locations of the endpoints of the line segment. The mass of the line segment can represent the number of observations (or range data points) used to form the line segment. The orientation is the orientation of the line segment on the floor of the environment. By storing this information in a matrix for each line segment in the vector map, the map can use significantly less memory than an occupancy grid.

Figure 12:
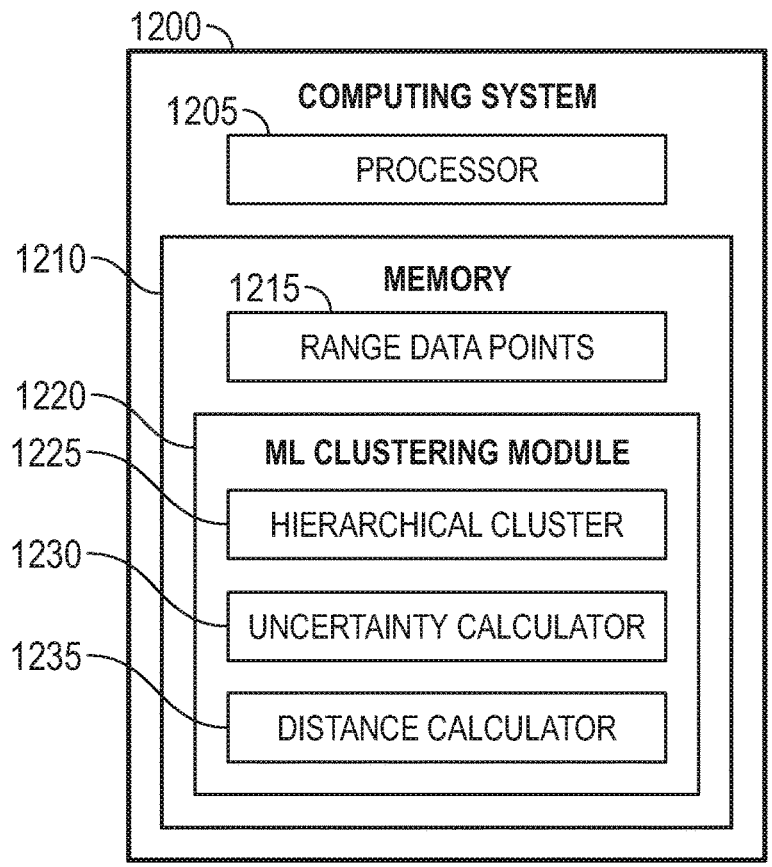
FIG. 12 is a block diagram of a computing system for performing a machine learning clustering algorithm, according to various embodiments.

FIG. 12 is a block diagram of a computing system 1200 for performing a machine learning clustering algorithm, according to various embodiments. The computing system 1200 can include a single computer or multiple interconnected computers (e.g., a data center). In one embodiment, the computing system 1200 may be part of the robot 105 illustrated in FIG. 1 and used to cluster range data points 1215 collected by the range sensor on the robot 105. However, the embodiments herein are not limited to being used by a robot for mapping environments. In other embodiments, the computing system 1200 is used in computer vision system to form depth images of an environment which can be used in navigation, video games (e.g., to generate virtual reality environment or an augmented reality environment), to identify motion in the environment, to identify specific objects in the environment for a computer vision system (e.g., a rocking chair versus a sofa), and the like.

The computing system 1200 includes a processor 1205 which represents any number of processing elements which can include any number of cores and a memory 1210 which can include volatile and non-volatile memory. The memory 1210 stores a machine learning (ML) clustering module 1220 which can be an application or a software module which uses range data points 1215 collected in an environment to generate a hierarchical cluster 1225. Generally, the hierarchical cluster 1225 includes multiple levels where each level contains features representing one or more real-world objects. For example, the first level (e.g., Level A) can include the range data points 1215 which correspond to points along edges of physical objects in the environment, the second level (e.g., Level B) can include lines that correspond to the edges of the physical object, the third level (e.g., Level C) can include interconnected lines forming boundaries of the physical objects, and the fourth level (e.g., Level D) can define the objects with an enclosure such as a room in the environment. While the embodiments below describe a hierarchical cluster 1225 with four levels, the cluster 1225 can have fewer levels or more levels depending on the application.

The ML clustering module 1220 includes an uncertainty calculator 1230 and a distance calculator 1235. The uncertainty calculator 1230 identifies an uncertainty of each feature at each level of the cluster 1225. For example, due to error or inaccuracies in the range sensor, the range data points 1215 may have uncertainty regions which indicate an area where the range data points 1215 may be located. An example of these uncertainty regions are shown in FIG. 7 by the ellipses 710 surrounding the points 705. The ellipses 710 indicate an uncertainty region centered at the points 705 which indicate where the actual location of the object should be. Thus, the actual point of the object is likely to be somewhere within the ellipses 710.

The uncertainty calculator 1230 can use the uncertainty of the range data points 1215 to determine uncertainty regions for the features in the higher-levels of the hierarchical cluster 1225. That is, after clustering the range data points 1215 to form a line, the uncertainty calculator can determine an uncertainty region for the location and orientation of the line in the environment. Put differently, the uncertainty calculator 1230 can determine an area where the line is most likely located.

The distance calculator 1235 calculates a distance between features in the levels of the cluster 1225. For example, the distance calculator 1235 can determine the distance between range data points 1215 in the first level of the cluster 1225, the distance between lines in the second level, and the distance between objects in the third level.

The ML clustering module 1220 determines whether to group features to a form higher-level feature using both the uncertainties determined by the uncertainty calculator 1230 and the distances determined by the distance calculator 1235. That is, unlike other clustering algorithms that rely solely on distance to determine whether to cluster the features in one level to form other features in a higher level, the ML clustering module 1220 uses uncertainties regarding the location and/or orientation of the features to determine whether the features should be grouped together in an upper level. Put differently, other ML clustering techniques do not consider the inaccuracies of the sensors used to generate the location/orientation information. By consider the uncertainties introduced by these errors, the ML clustering module 1220 can more accurately model the physical environment when clustering. Stated differently, the variance or uncertainty of the features provides a more accurate physical model of the environment. In one embodiment, the ML algorithm used by the ML clustering module 1220 is an unsupervised hierarchical agglomerative clustering algorithm which does not rely on training data to cluster the features at different levels.

Figure 13:
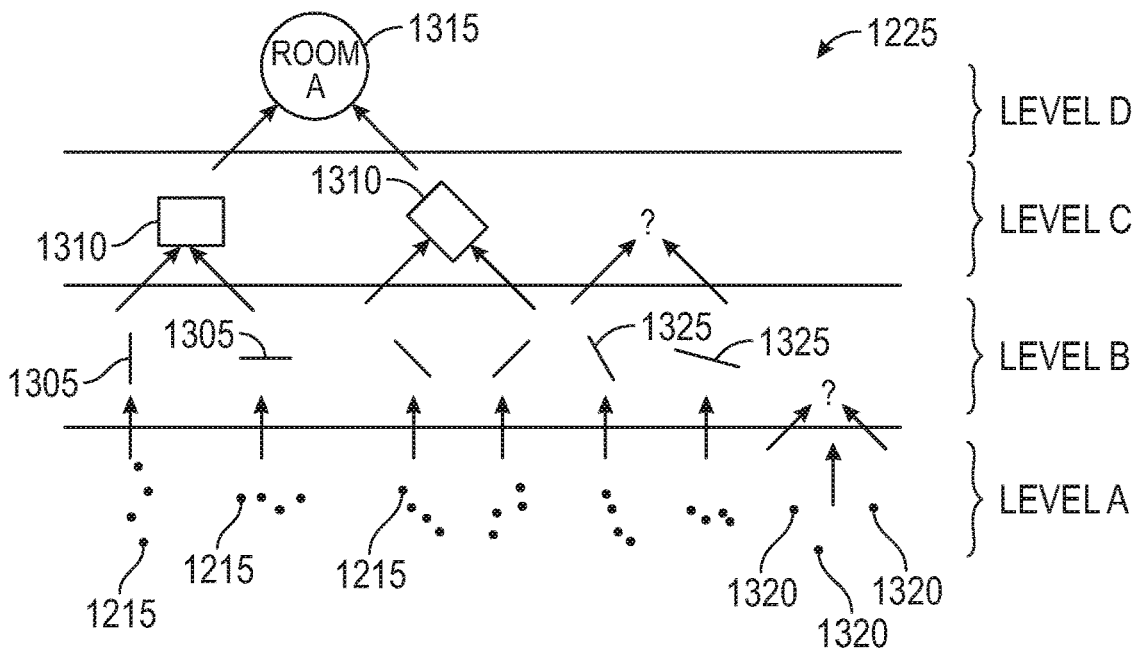
FIG. 13 illustrates using range data to generate a hierarchical cluster, according to various embodiments.

FIG. 13 illustrates using range data to generate the hierarchical cluster 1225, according to various embodiments. As shown, the cluster 1225 includes four levels: Level A, Level B, Level C, and Level D. Level A is the lowest level in the hierarchy and includes the range data points 1215. As mentioned above, range data points 1215 can correspond to points along an edge or surface of a physical object. As described in more detail below, the ML clustering module can cluster a set of the range data points 1215 in Level A to form a line 1305 in Level B. Each line 1305 corresponds to a portion of an edge of a physical object. However, at Level B, the ML clustering module does not know if the lines 1305 correspond to the same object or different objects.

At Level C, the clustering module clusters together lines 1305 from Level B to form outlines or boundaries 1310 of physical objects. The boundaries 1310 can outline a bottom surface of the object or a side surface of the object (e.g., the side the sensor is facing that generates the range data points 1215). At Level D, the clustering module identifies objects in Level C that can be clustered together into the same enclosure 1315 in the environment. In this example, two of the objects identified in Level C are clustered into Room A. For example, an environment (e.g., a house, business, or warehouse) may have multiple rooms and Level D can indicate which objects are located in which rooms (or enclosures 1315) within the environment.

However, not all of the features in each level in the cluster 1225 can be clustered to form a higher-level feature. In FIG. 13, Level A includes non-clusterable points 1320 which do not satisfy the clustering criteria. That is, using the distance between the points 1320 and their associated uncertainty regions, the ML clustering module determines that the points 1320 are non-clusterable. This means the ML cluster module determines the points 1320 are not part of the same edge or surface.

Similarly, the cluster 1225 includes non-clusterable lines 1325. These lines 1325 include range data points 1215 that were clusterable when moving from Level A to Level B, but the distances between the lines and their associated uncertainties means the ML clustering algorithm does not cluster the lines 1325 to form a boundary 1310 for the same object. Stated differently, the ML clustering module determines that the non-clusterable lines 1325 are edges of different objects, and thus, should not be clustered or grouped together in the next level—i.e., Level C.

Figure 14:
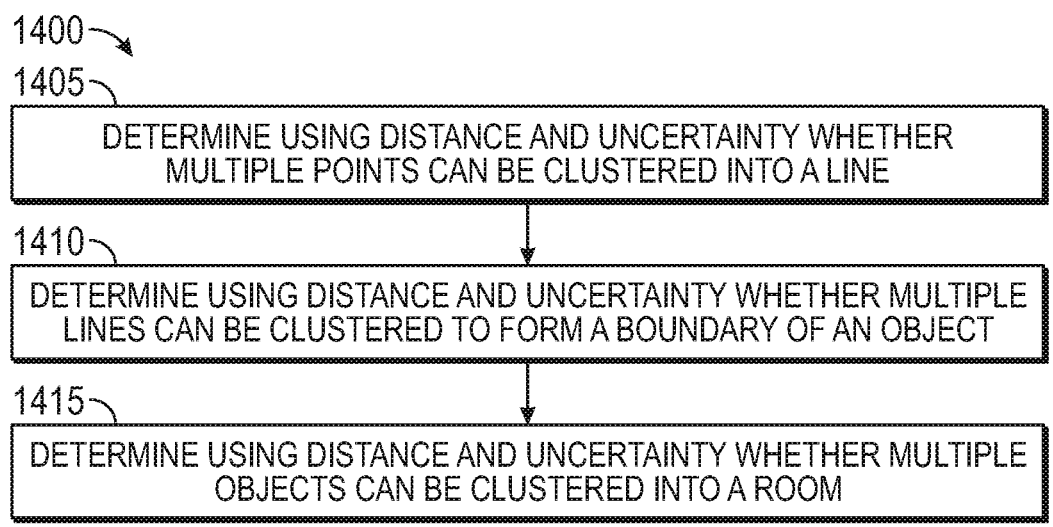
FIG. 14 is a flowchart for generating a hierarchical cluster, according to various embodiments.

FIG. 14 is a flowchart of a method 1400 for generating a hierarchical cluster, according to various embodiments. At block 1405, the ML clustering module determines, using distance and uncertainty, whether multiple points can be clustered into a line. For clarity, the method 1400 is discussed in tandem with the hierarchical cluster 1225 illustrated in FIG. 13. As shown there, the cluster module evaluates the range data points 1215 to identify a set of points 1215 that should be grouped together to form a higher-level feature in the next level of hierarchy—e.g., a line 1305. In one embodiment, the range data points 1215 may be identified by generating 2D or 3D point clouds from the range data generated by range sensor. Although the range sensor may be mounted on a robot, this is not a requirement. In other examples, the range sensor may be part of a video game system, a computer vision system, and the like.

In FIG. 13, the clustering module determines there are six sets of points 1215 that can be clustered to form lines while three of the points—i.e., the non-clusterable points 1320—should not. As described below, the ML clustering module can use the distance and uncertainty regions associated with the points 1215 to determine which point 1215 should be clustered into higher-level features and which should not.

At block 1410, the ML clustering module determines, using distance and uncertainty, whether multiple lines can be clustered to form a boundary of an object. That is, the endpoints of the lines can be connected to form a shape of a surface of the object such as the object's footprint in the floor of environment or a side surface of the object. In FIG. 13, the left two lines in the Level B are clustered together to form two sides of a boundary 1310 in Level C. The other two sides of the boundary 1310 may be formed from other lines in Level B which are not shown. Another two of the lines 1305 in Level B are clustered together to form two sides of the right boundary 1310 in Level C.

Like when clustering the range data points 1215, the ML clustering module can use distance and uncertainty to determine when lines 1305 should not be clustered together in an object. In FIG. 13, the right two lines 1305 in Level B are not clustered. That is, the ML clustering module determines that these lines 1305 define edges in different physical objects, and thus, should not be clustered together to form a boundary in Level C.

At block 1415, the ML clustering module determines, using distance and uncertainty, whether multiple objects can be clustered into a room or enclosure in the environment. For example, the environment may contain multiple rooms or portions which can be divided by actual walls or pre-defined boundaries (which may not be defined by physical structures). In FIG. 3, the distances and uncertainties associated with the objects defined by the boundaries 1310 are such that the clustering module determines they are in the same enclosure 1315—i.e., Room A. Thus, the objects in Level C are grouped together into the enclosure 1315 in Level D.

Although not shown, objects in Level C may be spread far enough apart (or have large enough uncertainties) that the clustering module does not cluster these objects into the same enclosure with other objects. In that case, the objects may not be clustered thereby indicating they are in their own enclosures or that the clustering algorithm is unable to definitively determine which enclosure the object is in.

Figure 15:
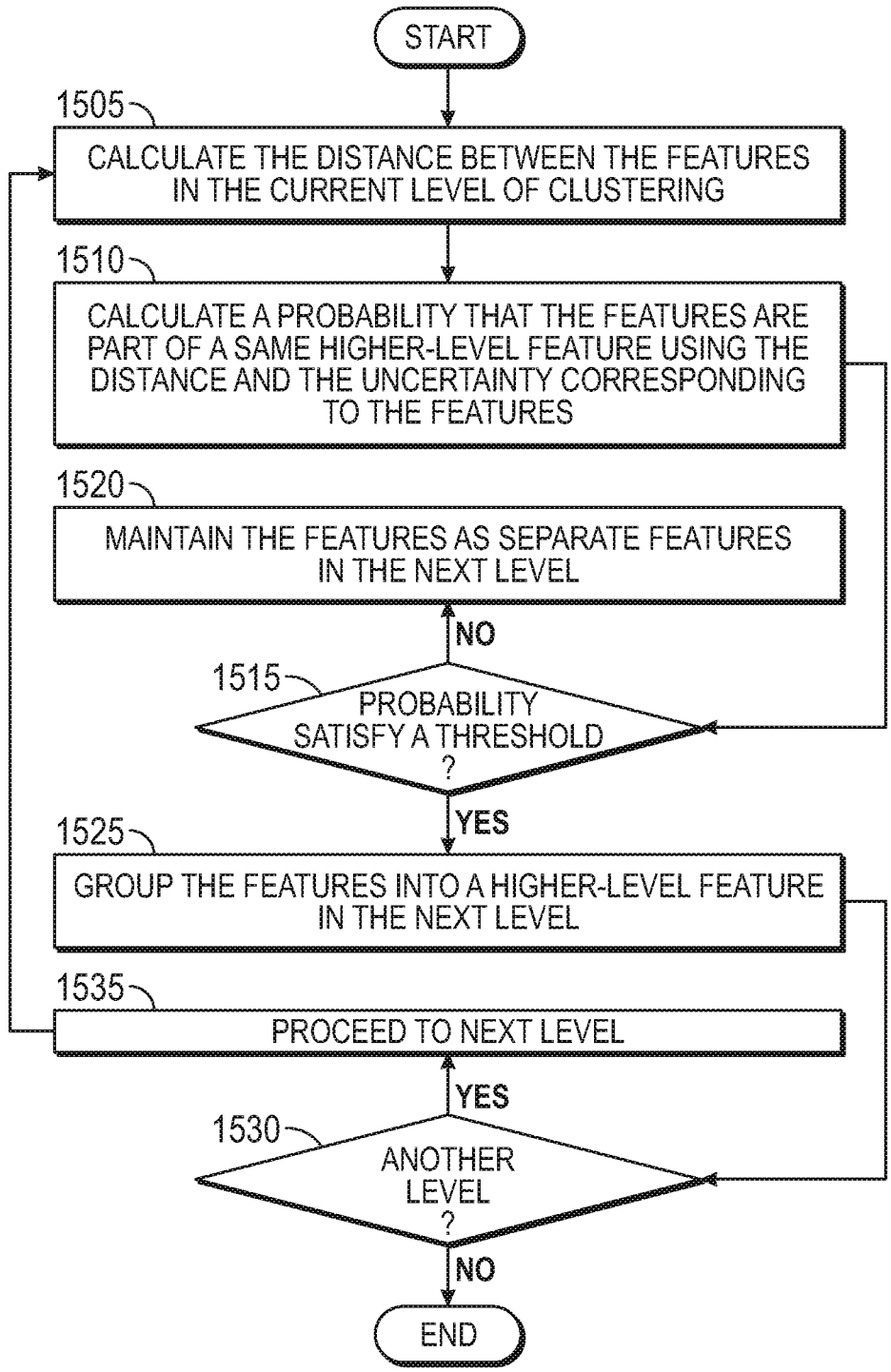
FIG. 15 is a flowchart for grouping features into higher-level features, according to various embodiments.

FIG. 15 is a flowchart of a method 1500 for grouping features into higher-level features, according to various embodiments. In one embodiment, the method 1500 is repeated when clustering features at each level in the hierarchical cluster. For example, the method 1500 may be used to cluster the range data points in Level A to form the lines in Level B and then used again to cluster the lines in Level B to form the object boundaries in Level C, and so forth.

At block 1505, the distance calculator calculates the distance between the features in the current level of clustering. Using the range data points as an example, the distance calculator can calculate the distance between each point from every other point in the range data points. The points that correspond to an edge or surface on the same physical object are generally closer than points that correspond to an edge or surface on a different physical object.

When clustering lines, the distance calculator may determine the distances between the midpoints in the lines. When clustering object boundaries, the distance calculator may determine the distance from the center of one object boundary to the centers of the other object boundaries. However, these are only example of measuring the distances between lines and objects and other methods and techniques can be used to identify these distances.

At block 1510, the uncertainty calculator calculates a probability that the features are part of a same higher-level feature using the distance the uncertainty corresponding to the feature. That is, rather than relying solely on distance, the ML clustering module can use the uncertainty of the features—e.g., the variance in the location of the features due to errors or inaccuracies in the range data—to determine a probability that two features are part of the same high-level feature. For example, the distance calculator may determine that two range data points are within 2 cm of each other while the uncertainty calculator determines that the uncertainty region of the points (e.g., the ellipses illustrated in FIG. 7) has a 2 cm diameter. The size of the uncertainty region may be determined from the specifications of the range sensor (e.g., the manufacturer states it has an accuracy of +/−1 cm) or by testing the range sensor in the environment. Given these distance and uncertainty values, the uncertainty calculates determines that there is a 90% likelihood that the two points are part of the same edge or surface.

In another example, two range data points may be separated by 2 cm but the uncertainty region may be only 1 mm in diameter (e.g., the range sensor is more accurate). In this example, even though the separation distance is the same as in the previous example, the uncertainty calculator determines that there is a 10% likelihood that the two points are part of the same edge or surface. As such, by identifying and considering uncertainty in addition to distance between features, the ML clustering module can make more accurate decisions regarding whether lower-level features should be clustered together to form higher-level features.

In one embodiment, the uncertainty calculator uses the uncertainties corresponding to the range data points to generate uncertainties for the higher-level features—e.g., the lines and object boundaries. For example, the uncertainty calculator can identify a respective covariance for the endpoints in the lines. The calculator can also determine an uncertainty in the location of the object boundaries from the uncertainty of the endpoints of the individual lines forming the boundaries. In this manner, the uncertainty of the range data can be used at each level to determine which features to cluster.

At block 1515, the ML clustering module determines whether the probability determined at block 1510 satisfies a threshold. For example, the ML clustering module may require that the probability be above 80% before the features are clustered. That is, for four points to be clustered into a line, the points may have to all have to have at least an 80% probability that they are part of the same object. In another example, rather than all of the points having to have a threshold probability when compared to all the other points, the ML clustering module may cluster points so long as at least one point has a probability of at least 80% that it is part of the same edge as at least one other point in the set of four points. In this example, some of the clustered points in the line may have a probability relative to other points in the line that is less than 80%.

If the current feature does not have sufficient probability scores to be clustered, the method 1500 proceeds to block 1520 where the ML clustering module maintains the feature as a separate feature in the next level of the hierarchical cluster. Put differently, the feature is not combined with other features to form a higher-level feature in the next level.

If the probability is satisfied, at block 1525 the ML clustering method groups the features into a higher-level feature in the next level. For example, a subset of range data points are clustered into a line or a subset of the lines is clustered into an object boundary.

At block 1530, the ML clustering module determines whether there is another level in the hierarchical cluster that should still be evaluated. That is, the clustering module determines whether the method 1500 has reached the top of the hierarchical cluster. If not, at block 1535 the ML clustering module proceeds to the next level and repeats the method 1500. If so, the method 1500 ends.

Once the hierarchical cluster is generated, the computing system can transmit the cluster to be used by a robotic navigation system, a video game system to generate a VR or AR environment, a computer vision system, and the like. Using the clustered data, these systems can identify objects in the environment, navigate through the environment, display virtual content, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
generating first range data using a range sensor on a robot when at a first location, wherein the first range data represents edges of physical objects in an environment;
generating second range data using the range sensor on the robot when at a second location;
generating a first depth cloud based on the first range data and a second depth cloud based on the second range data, wherein the first and second depth clouds comprise points representing an edge of a physical object;
converting the first depth cloud into a first set of line segments and the second depth cloud into a second set of line segments;
identifying a plurality line segments from the first set that each match a respective one of the line segments in the second set to form matched line segments using an iterative closest vector (ICV) technique, wherein each of the matched line segments correspond to a same edge of a same physical object in the environment;
merging the matched line segments upon determining a covariance corresponding to an endpoint of a first matched line segment of the matched line segments overlaps a second matched line segment of the matched line segments; and
generating a vector map based on the merged line segments, wherein the vector map indicates the edges of the physical objects in the environment.

2. The method of claim 1, wherein forming the matched line segments using the ICV technique comprises:
identifying a translation cost and a rotation cost between the first set of line segments and the second set of line segments, wherein line segments in the first and second sets with a lowest translation and rotation costs are formed as the matched line segments.

3. The method of claim 1, wherein converting the first depth cloud into a first set of line segments and the second depth cloud into a second set of line segments comprises:
identifying, using clustering, a first set of points in the first depth cloud corresponding to the edge of the physical object and a second set of points in the second depth cloud corresponding to the edge of the physical object;
identifying an uncertainty corresponding to each of the points in the first and second sets of points; and
iteratively identifying a first group of line segments corresponding to the first set of points and a second group of line segments corresponding to the second set of points based on the uncertainties.

4. The method of claim 3, wherein converting the first depth cloud into a first set of line segments and the second depth cloud into a second set of line segments comprises:
identifying a first representative line segment for the first group of line segments and a second representative line segment for the second group of line segments; and
estimating a covariance for each endpoint of the first and second representative line segments.

5. The method of claim 4, further comprising:
in response to determining that the covariance of the endpoint of the first representative line segments overlaps the second representative line segment, merging the first and second representative line segments to form a line in the vector map.

6. A method comprising:
generating first range data using a range sensor on a robot when at a first location, wherein the first range data represents physical objects in an environment;
generating second range data using the range sensor on the robot when at a second location;
identifying a first set of line segments from the first range data and a second set of line segments from the second range data;
matching multiple line segments in the first set to respective ones of the line segments in the second set to form matched line segments based on (i) comparing translations and orientations of the line segments in the first and second sets and (ii) covariances assigned to endpoints of the line segments in the first and second sets, wherein each of the matched line segments corresponds to a same edge of a physical object in the environment;
generating a map of the environment based on the matched line segments; and
navigating the robot through the environment using the map.

7. The method of claim 6, wherein each of the matched line segments forms a vector in the map of the environment.

8. The method of claim 6, wherein forming the matched line segments comprises:
identifying a translation cost and a rotation cost between the first set of line segments and the second set of line segments, wherein line segments in the first and second sets with a lowest translation and rotation costs are formed as the matched line segments.

9. The method of claim 6, further comprises:
generating first and second depth clouds from the first and second range data; and
identifying, using clustering, a first subset of points in the first depth cloud that correspond to a first edge of a first physical object and a second subset of points in the second depth cloud that correspond to a first edge of a second physical object.

10. The method of claim 9, further comprising:
identifying an uncertainty corresponding to each of the points in the first and second subsets of points; and
iteratively identifying a first group of line segments corresponding to the first subset of points and a second group of line segments corresponding to the second subset of points based on the uncertainties.

11. The method of claim 10, further comprising:
identifying a first representative line segment for the first group of line segments and a second representative line segment for the second group of line segments; and
estimating a covariance for each endpoint of the first and second representative line segments.

12. The method of claim 11, wherein matching the multiple line segments comprises:
upon determining that a first line segment in the first set has a covariance that overlaps with a second line segment in the second set, merging the first line segment and the second line segment.

13. The method of claim 6, wherein each line segment in the first and second sets corresponds to an edge of a physical object in the environment, wherein the line segments are stored in memory as respective scatter matrices, where each scatter matrices defines an range of uncertainty for the endpoints of each line segment in the first and second sets.

14. A robot, comprising:
a movement system configured to move the robot through an environment;
a range sensor configured to:
generate first range data when the robot is at a first location, and
generate second range data when the robot is at a second location;
a line generator configured to identify a first set of line segments from the first range data and a second set of line segments from the second range data; and
a line merger configured to:
match multiple line segments in the first set to respective ones of the line segments in the second set to form matched line segments based on (i) comparing translations and orientations of the line segments in the first and second sets and (ii) covariances assigned to endpoints of the line segments in the first and second sets, wherein each of the matched line segments corresponds to a same edge of a physical object in the environment.

15. The robot of claim 14, wherein the line generator is configured to:
generate a map of the environment based on the matched line segments,
wherein each of the matched line segments forms a vector in the map of the environment, wherein a navigation system is configured to navigate the robot through the environment using the map.

16. The robot of claim 14 wherein forming the matched line segments comprises:
identifying a translation cost and a rotation cost between the first set of line segments and the second set of line segments, wherein line segments in the first and second sets with a lowest translation and rotation costs are formed as the matched line segments.

17. The robot of claim 14, wherein the line generator is further configured to:
generate first and second depth clouds from the first and second range data; and
identify, using clustering, a first subset of points in the first depth cloud that correspond to a first edge of a first physical object and a second subset of points in the second depth cloud that correspond to a first edge of a second physical object.

18. The robot of claim 17, wherein the line generator is further configured to:
identify an uncertainty corresponding to each of the points in the first and second subsets of points; and
iteratively identify a first group of line segments corresponding to the first subset of points and a second group of line segments corresponding to the second subset of points based on the uncertainties.

19. The robot of claim 18, wherein the line generator is further configured to:
identify a first representative line segment for the first group of line segments and a second representative line segment for the second group of line segments; and
estimate a covariance for each endpoint of the first and second representative line segments.

20. The robot of claim 19, wherein matching the multiple line segments comprises:
upon determining that a first line segment in the first set has a covariance that overlaps with a second line segment in the second set, merging the first line segment and the second line segment.

* * * * *